(12) United States Patent
Kizaki

(10) Patent No.: US 10,852,548 B2
(45) Date of Patent: Dec. 1, 2020

(54) ELECTRONIC DEVICE, WEARABLE DEVICE, AND SETTING METHOD

(71) Applicant: Dynabook Inc., Tokyo (JP)

(72) Inventor: Shigeki Kizaki, Tokyo (JP)

(73) Assignee: Dynabook Inc., Tokyo (JP)

( * ) Notice: Subject to any disclaimer, the term of this patent is extended or adjusted under 35 U.S.C. 154(b) by 8 days.

(21) Appl. No.: 16/280,776

(22) Filed: Feb. 20, 2019

(65) Prior Publication Data
US 2020/0064634 A1 Feb. 27, 2020

(30) Foreign Application Priority Data

Aug. 27, 2018 (JP) .................................. 2018-158395

(51) Int. Cl.
*G02B 27/01* (2006.01)
*G06F 3/01* (2006.01)
*G06F 3/0354* (2013.01)

(52) U.S. Cl.
CPC ..... *G02B 27/0172* (2013.01); *G02B 27/0179* (2013.01); *G06F 3/011* (2013.01); *G06F 3/03547* (2013.01); *G02B 2027/0138* (2013.01); *G02B 2027/0178* (2013.01)

(58) Field of Classification Search
CPC ............ G02B 27/0172; G02B 27/0179; G02B 2027/0138; G02B 2027/0178; G06F 3/011; G06F 3/03547; G06F 3/0346; G06F 1/163
See application file for complete search history.

(56) References Cited

U.S. PATENT DOCUMENTS

2016/0216792 A1 7/2016 Ogawa et al.
2019/0080641 A1* 3/2019 Wu ........................ G06F 3/1423

FOREIGN PATENT DOCUMENTS

| JP | 2009-021780 A | 1/2009 |
| JP | 2016-149587 A | 8/2016 |
| WO | WO 2017/018370 A1 | 2/2017 |

* cited by examiner

*Primary Examiner* — Mark W Regn
(74) *Attorney, Agent, or Firm* — Knobbe, Martens, Olson & Bear, LLP

(57) ABSTRACT

According to one embodiment, an electronic device is connectable to a wearable device which includes a plurality of devices each having a directionality. The electronic device includes a processor. The processor sets a usage form of the wearable device. The usage form includes the directionality of each of the plurality of devices. When the usage form is set to change from a first form to a second form, the processor changes a setting of the directionality of all of the plurality of devices to reverse the directionality of each of the plurality of devices.

12 Claims, 13 Drawing Sheets

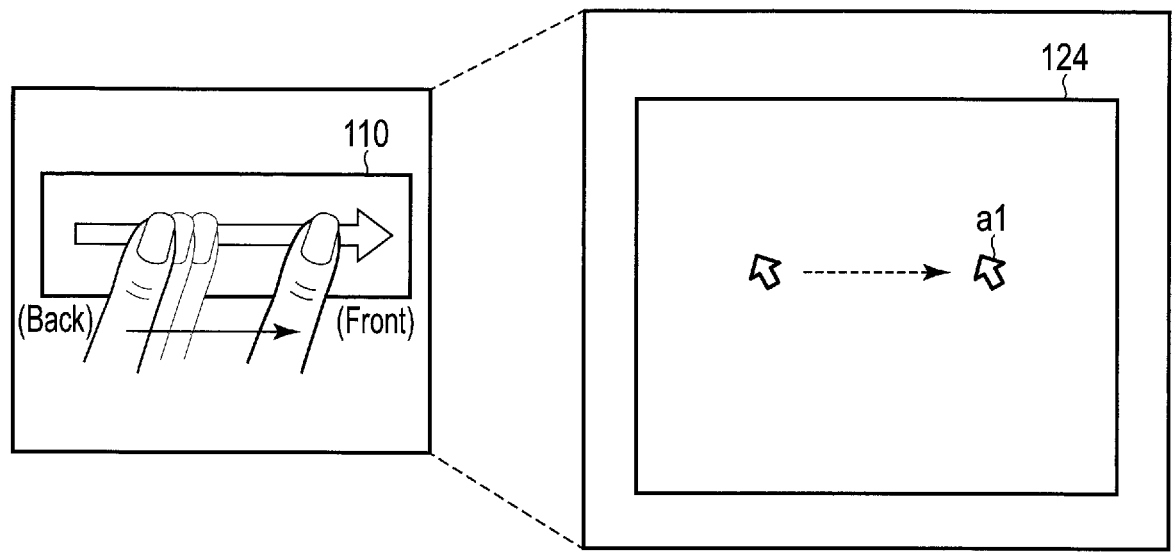
F I G. 6A
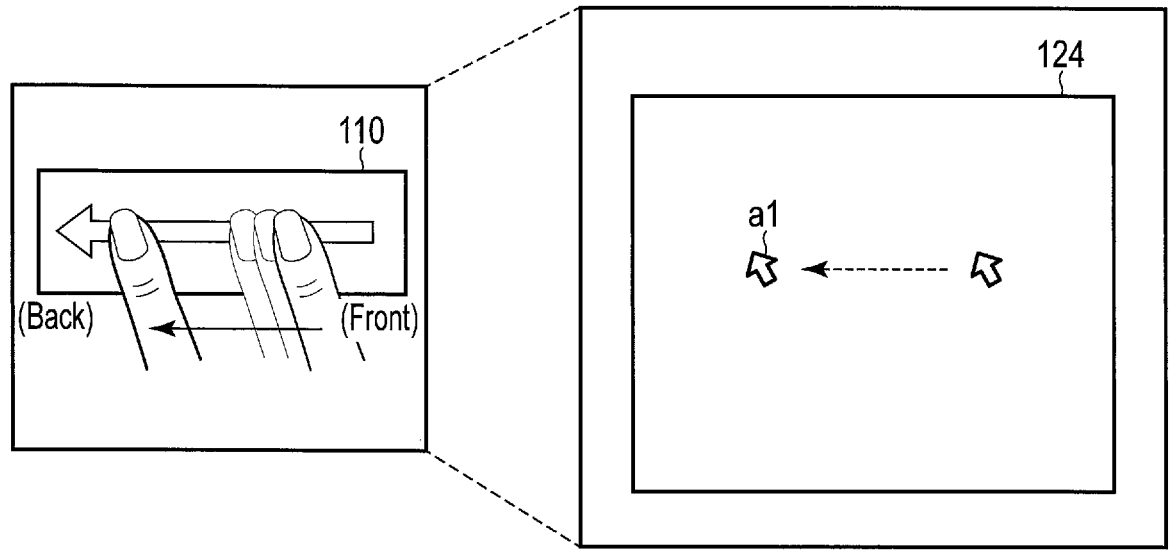
F I G. 6B

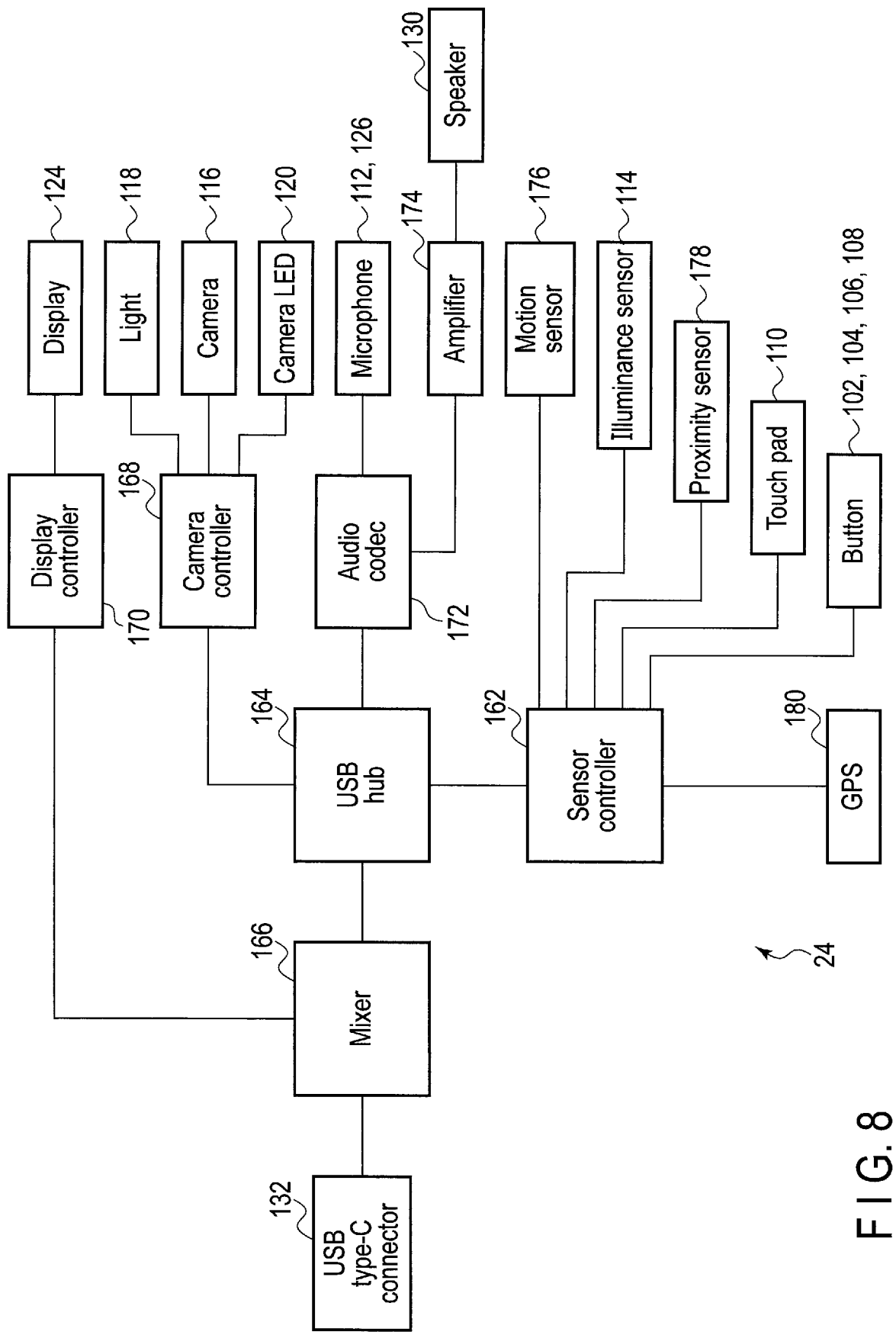
F I G. 8

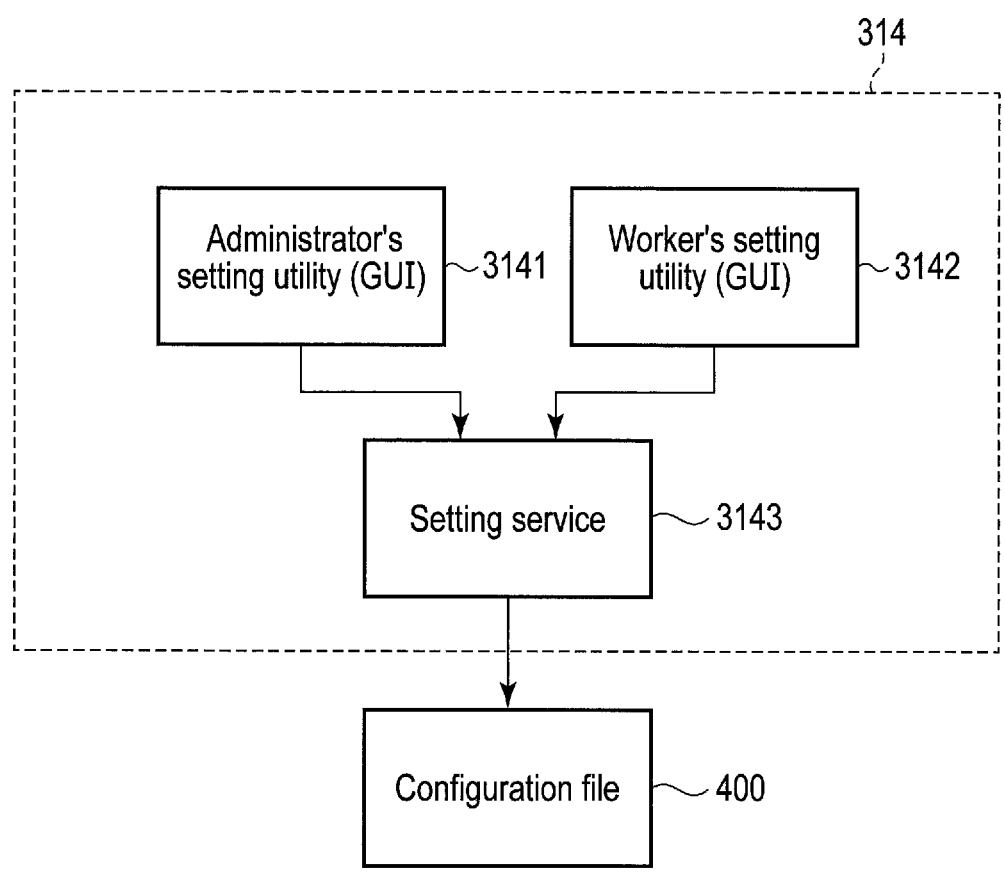
F I G. 10

| Title | Setting | Option | Default | Remark |
|---|---|---|---|---|
| Display | Auto Brightness | On / Off | On | |
| | Brightness | 0-255 | 70 | |
| b5 — Auto Orientation | | On / Off | Off | |
| b1 — Orientation | | Left / Right | Right | |
| Touchpad | Touchpad | On / Off | On | |
| b2 — Flip up-down direction | | On / Off | Off | |
| b3 — Flip left-right direction | | On / Off | Off | |
| Flashlight | Auto LED light | On / Off | On | |
| Audio | Audio mode | Voice call / Live recording / Personal recording | Live recording | |
| Button | Current profile | 0-7 | 0 | |
| | Button A Short key Code | USB HID Keycode | 114 | |
| | Button B Short key Code | | 40 | |
| | Button C Short key Code | | 112 | |
| | Button D Short key Code | | 108 | |
| | Button A Long key Code | | 114 | |
| | Button B Long key Code | | 41 | |
| | Button C Long key Code | | 112 | |
| b4 — Button D Long key Code | | | 104 | |
| Camera | Orientation | Left / Right | Right | |

FIG. 11

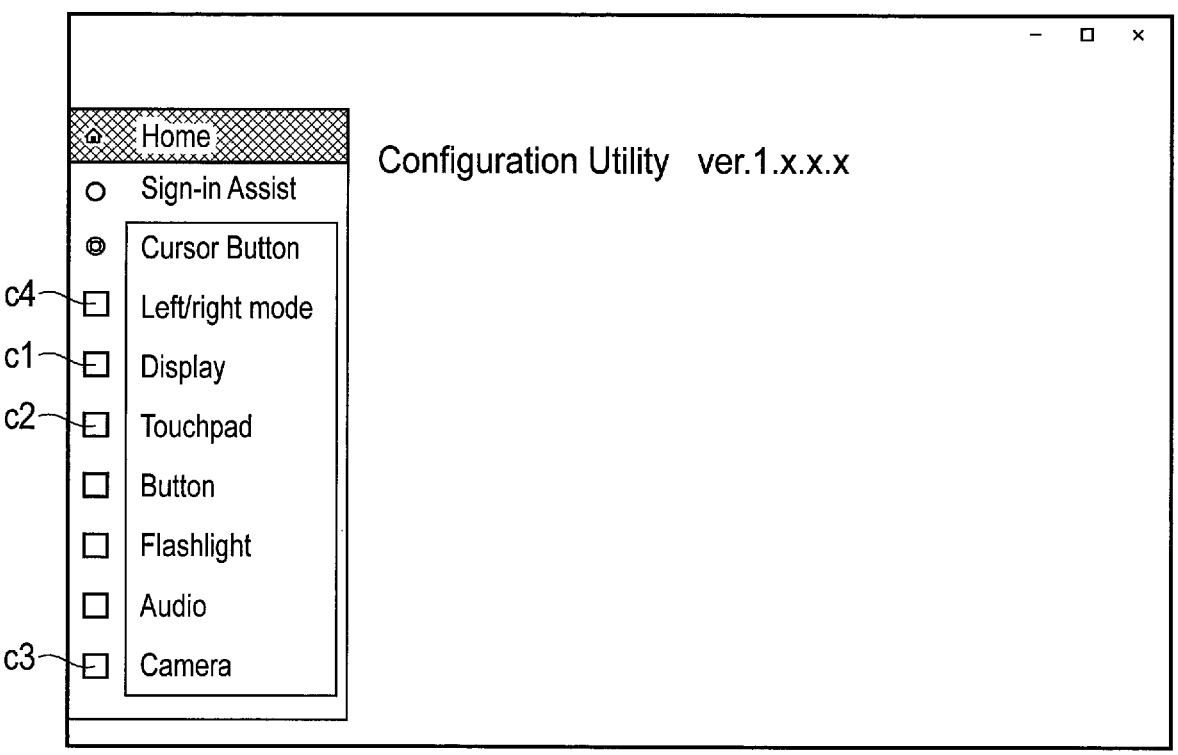
F I G. 12

ELECTRONIC DEVICE, WEARABLE DEVICE, AND SETTING METHOD

CROSS-REFERENCE TO RELATED APPLICATIONS

This application is based upon and claims the benefit of priority from Japanese Patent Application No. 2018-158395, filed Aug. 27, 2018, the entire contents of which are incorporated herein by reference.

FIELD

Embodiments described herein relate generally to an electronic device, a wearable device, and a setting method.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device having high degrees of versatility and processing capacity and can be used by a worker (user) on site is needed separately from a data center (or cloud). Thereby, it is expected that promotion of the operational efficiency and productivity improvement at a workplace and the like or load dispersion of data and improvement or the like in a network environment will be achieved.

For example, to a mobile edge computing device which is put into a pocket of a work clothes of a worker and is carried by the worker, for example, an eyeglass type wearable device provided with a touch pad for carrying out various operations, a display for displaying information sent thereto from a data center, a camera for shooting an image of a work site to be sent to the data center, and the like can be connected. Among eyeglass type wearable devices, there is a device in which a main unit is attached to one of right and left temples of the eyeglass frame. In the case of the eyeglass type wearable device of this kind, the display is visually watched by one of, for example, a right eye and left eye, the one being a dominant eye, i.e., by a single eye.

Incidentally, the main unit is normally flipped upside down according to whether the main unit is attached to the right side temple of the eyeglass frame or to the left side temple thereof. On the other hand, each of the touch pad, the display, the camera, and the like is a device having directionality such as the top and bottom, and left and right. Accordingly, when the placement of the main unit is temporarily changed from the right side temple of the eyeglass frame to the left side temple thereof for the reason or the like of, for example, securement of a visual field at a job site, there is a need to change the setting of the directionality with respect each of the devices having directionality. Further, in the case where the user has carried out setting unique to the user with respect to the directionality of a certain device, the setting of the directionality of the device should be changed in consideration of the unique setting.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 6A and 6B are exemplary first and second views for explaining setting of right-and-left directionality of a touch pad provided in the wearable device main body in the embodiment.

FIG. 8 is a block diagram showing an exemplary structure of the wearable device main body of the embodiment.

FIG. 10 is a view showing an example of various application programs to be provided in the mobile PC of the embodiment in order that the mobile PC may improve the usability regarding setting of a device having directionality.

FIG. 11 is a view showing an example of a configuration file to be used in the mobile PC of the embodiment.

FIG. 12 is a view showing an example of a setting screen of various devices (provided in the wearable device main body) displayed by the mobile PC of the embodiment.

DETAILED DESCRIPTION

Figure 1:
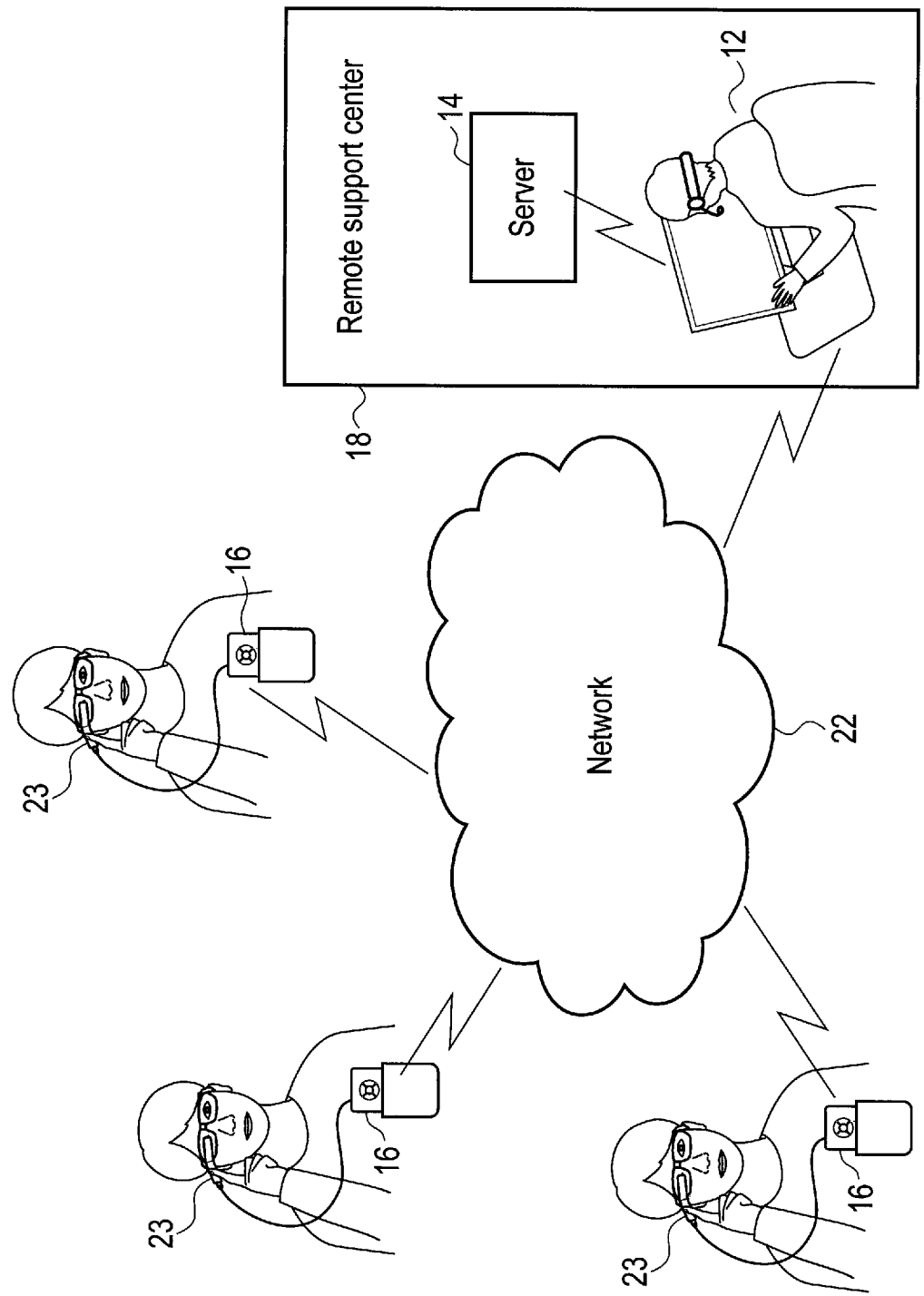
FIG. 1 is a block diagram showing an example of a remote support system including an electronic device (mobile PC) of an embodiment.

Various embodiments will be described hereinafter with reference to the accompanying drawings.

In general, according to one embodiment, an electronic device is connectable to a wearable device which includes a plurality of devices each having a directionality. The electronic device includes a processor. The processor sets a usage form of the wearable device. The usage form includes a directionality of each of the plurality of devices. When the usage form is set to change from a first form to a second form, the processor changes a setting of the directionality of all of the plurality of devices to reverse the directionality of each of the plurality of devices.

The following disclosure is presented by way of example only, and is not intended to limit the scope of the invention by the description of the disclosure. Various modifications that will readily occur to those skilled in the art are indeed made without departing from the spirit or scope of the disclosure. For clearer explanation, the accompanying drawings may be illustrated schematically by changing size, shape, and the like of constituent components relative to the actual dimensions of the embodiments. The same reference numbers are given in some cases to the corresponding elements in the drawings, and the detailed description of such elements will not be repeated.

[Remote Support System]

FIG. 1 is a block diagram showing an example of a remote support system configured to realize edge computing. The remote support system is configured to be used by an operator at the rear to support a user, for example, a worker at a workplace from a remote place. Examples of work at the workplace include a complicated maintenance service, picking operation in a distribution warehouse, monitoring of a workplace, disaster relief/medical support, and the like. The worker side of the workplace is also called a front end, and the operator side at the rear is also called a back end. In the remote support system, a mobile personal computer (PC) (also called a mobile edge computing device in some cases) 16 carried by the worker and remote support center (data center) 18 located at a position distant from the worker are connected to each other through a network 22, such as the Internet, so that communication can be carried out between them. The mobile PC 16 and remote support center 18 may be connected to the network 22 through wired LAN cables or may be connected to the network 22 through a wireless LAN, Bluetooth (registered trade mark), and the like.

A wearable device 23 is connected to the mobile PC 16. Although FIG. 1 shows an example in which the wearable device 23 is connected to the mobile PC through a cable, the wearable device 23 may also be connected to the mobile PC 16 through a wireless LAN, Bluetooth or the like. The wearable device 23 is provided with a camera and display device. An image shot by the camera may be displayed on the display device. An image shot by the camera may be transmitted to the mobile PC 16, and the image transmitted from the mobile PC 16 may be displayed on the display device.

As shown in FIG. 1, it is also possible for a plurality of workers to communicate with each other through the network. In this case, communication may also be carried out through the remote support center 18, and communication can also be carried out only between the workers without being carried out through the operator of the remote support center 18.

The remote support center 18 is provided with an operator terminal 12 and server 14. The remote support center 18 makes a voice call or information exchange between the mobile PC 16 (and wearable device 23) and operator terminal 12. It is possible to carry out video distribution of a real-time image shot by the wearable device 23 connected to the mobile PC 16 to the operator terminal 12, and it is also possible to carry out mutual transmission/reception of an image between the mobile PC 16 and operator terminal 12. Further, it is also possible to transmit a text message from the operator terminal 12 to the mobile PC 16. For example, in the picking operation in the distribution warehouse, a place of a picking item is displayed on the wearable device 23, whereby hands-free picking can be realized.

The remote support typically includes, for example, the following functions:

A voice call function of carrying out an interactive voice call between the mobile PC 16 and operator terminal 12;

A live image distribution function of carrying out video distribution of a real-time image shot by the wearable device 23 to the operator terminal 12 during a voice call;

A function of carrying out transmission/reception of a still image between the mobile PC 16 and operator terminal 12 during a voice call (The mobile PC 16 transmits a shot still image or capture image being video-distributed to the operator terminal 12. The operator terminal 12 edits the received picture by writing characters or pictures, and transmits the edited image to the mobile PC 16. The still image received by the mobile PC 16 is stored in a folder in the mobile PC 16, and can be browsed.);

A screen sharing function of displaying the entire desktop screen of the operator terminal 12 or a window of an arbitrary application program on the wearable device 23 during a voice call; and A text message transmitting function of transmitting a text message from the operator terminal 12 to the mobile PC 16.

The server 14 is configured to carry out processing for remote support in place of or in cooperation with the operator terminal 12. The operator terminal 12 may be made to have all the functions of the server 14, and the server 14 may be omitted.

[Operator Terminal 12]

The operator terminal 12 is constituted of a desktop PC, notebook PC or the like.

The operator issues an instruction to the worker having the mobile PC 16 by a conversation or image while confirming the situation of the workplace on the basis of a real-time image by using the operator terminal 12. The operator can write pictures or characters to the image file received from the mobile PC 16 by using the operator terminal 12 to edit the image file, transmit the edited image file to the mobile PC 16, and store the edited image file in the operator terminal 12.

[Mobile PC 16]

Figure 2:
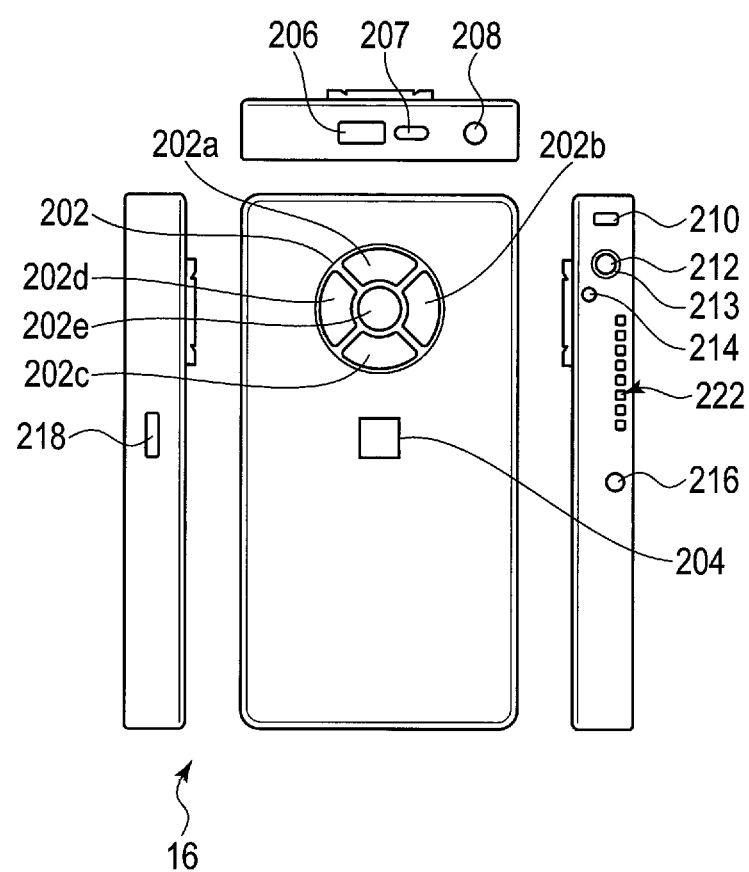
FIG. 2 is a view showing an example of an external appearance of the mobile PC of the embodiment.

FIG. 2 shows an example of an external appearance of the mobile PC (mobile edge computing device) 16. The mobile PC 16 is a small-sized PC that can be held by one hand, and has a small size and light weight, i.e., a width thereof is about 10 cm or less, height thereof is about 18 cm or less, thickness thereof is about 2 cm, and weight thereof is about 300 g. Accordingly, the mobile PC 16 can be held in a pocket of the work clothing of the worker, holster to be attached to a belt, or a shoulder case, and is wearable. Although the mobile PC 16 incorporates therein semiconductor chips such as the CPU, semiconductor memory, and the like, and storage devices such as a Solid State Disk (SSD), and the like, the mobile PC 16 is not provided with a display device and hardware keyboard for input of characters.

On the front surface of the mobile PC 16, five buttons 202 constituted of an up button 202*a*, right button 202*b*, down button 202*c*, left button 202*d*, and decision button 202*e* (also called a center button or enter button) are arranged, and fingerprint sensor 204 is arranged below the five buttons 202. The mobile PC 16 is not provided with a hardware keyboard for input of characters, and a password number (also called a PIN) cannot be input. Therefore, the fingerprint sensor 204 is used for user authentication at the time of login of the mobile PC 16. The five buttons 202 can input a command.

User authentication at the time of login may be carried out by allocating numeric characters to the buttons 202*a* to 202*d* of the five buttons 202, and inputting a password number by using the five buttons 202. In this case, the fingerprint sensor 204 can be omitted. Numeric characters are allocated to the four buttons other than the decision button 202*e*, and the number of the numeric characters is only four. Thus, there is a possibility of numeric characters input in a random manner being coincident with the password number. However, by making the digit number of the password number large, it is possible to make the probability that the numeric characters input in a random manner will be coincident with the password number low. Authentication by the five buttons 202 may be enabled in also a mobile PC 16 provided with a fingerprint sensor 204. Although one mobile PC 16 may be shared among a plurality of workers, it is not possible to cope with such a case by only the fingerprint authentication.

The operations identical to those of the buttons 102, 104, 106, and 108, and touch pad 110 of the wearable device main body 24 can also be applied to the five buttons 202. The worker cannot watch the state where the buttons 102, 104, 106, and 108, and touch pad 110 of the wearable device main body 24 are being operated. Therefore, it may be necessary for a worker to become accustomed to carrying out an intended operation depending on the worker. Further, the buttons 102, 104, 106, and 108, and touch pad 110 are small in size, and thus they may be difficult to operate. In the embodiment, the five buttons 202 of the mobile PC 16 can also be operated in the same manner as above, and hence the above-mentioned fear can be dispelled. The operation procedures of the five buttons 202 are determined by the application program.

For example, when the decision button 202e is pressed once, item selection/item execution is carried out (corresponding to pressing once of the third button 106 in the wearable device main body 24), when the decision button 202e is pressed for a long time, ending or cancellation of an operation is carried out (corresponding to pressing once of the first button 102 in the wearable device main body 24), when the up button 202a is pressed once, the cursor is moved upward (corresponding to upward drag on the touch pad 110 in the wearable device main body 24), when the up button 202a is pressed for a long time, a list of activated application programs is displayed (corresponding to pressing the third button 106 for a long time in the wearable device main body 24), when the down button 202c is pressed once, the cursor is moved downward (corresponding to downward drag on the touch pad 110 in the wearable device main body 24), when the down button 202c is pressed for a long time, a menu of quick settings is displayed (corresponding to pressing of the second button 104 for a long time in the wearable device main body 24), when the left button 202d is pressed once, the right icon is selected (corresponding to backward drag/flick on the touch pad 110 in the wearable device main body 24), and when the right button 202b is pressed once, the left icon is selected (corresponding to forward drag/flick on the touch pad 110 in the wearable device main body 24).

On the upper side face of the mobile PC 16, a USB 3.0 connector 206, USB type-C connector 207, and audio jack 208 are provided.

On one side face (side face on the left side when viewed from the front) of the mobile PC 16, a memory card slot 218 for a memory card is provided. The memory card includes, for example, an SD card, micro SD card (registered trade mark), and the like.

On the other side face (side face on the right side when viewed from the front) of the mobile PC 16, a slot 210 for Kensington Lock (registered trade mark), power switch 212, power LED 213, DC IN/battery LED 214, DC terminal 216, and ventilation holes 222 for cooling are provided. The power LED 213 is arranged around the power switch 212, and turned on during the period of power-on. The DC IN/battery LED 214 indicates the state of the mobile PC 16 such as whether or not the battery is being charged, and remaining battery level. Although the mobile PC 16 can be driven by the battery, the mobile PC 16 can also be driven in the state where the AC adaptor is connected to the DC terminal 216. Although not shown, the back side of the mobile PC 16 is configured such that the battery can be replaced with a new one by a one-touch operation.

[Wearable Device 23]

Figure 3:
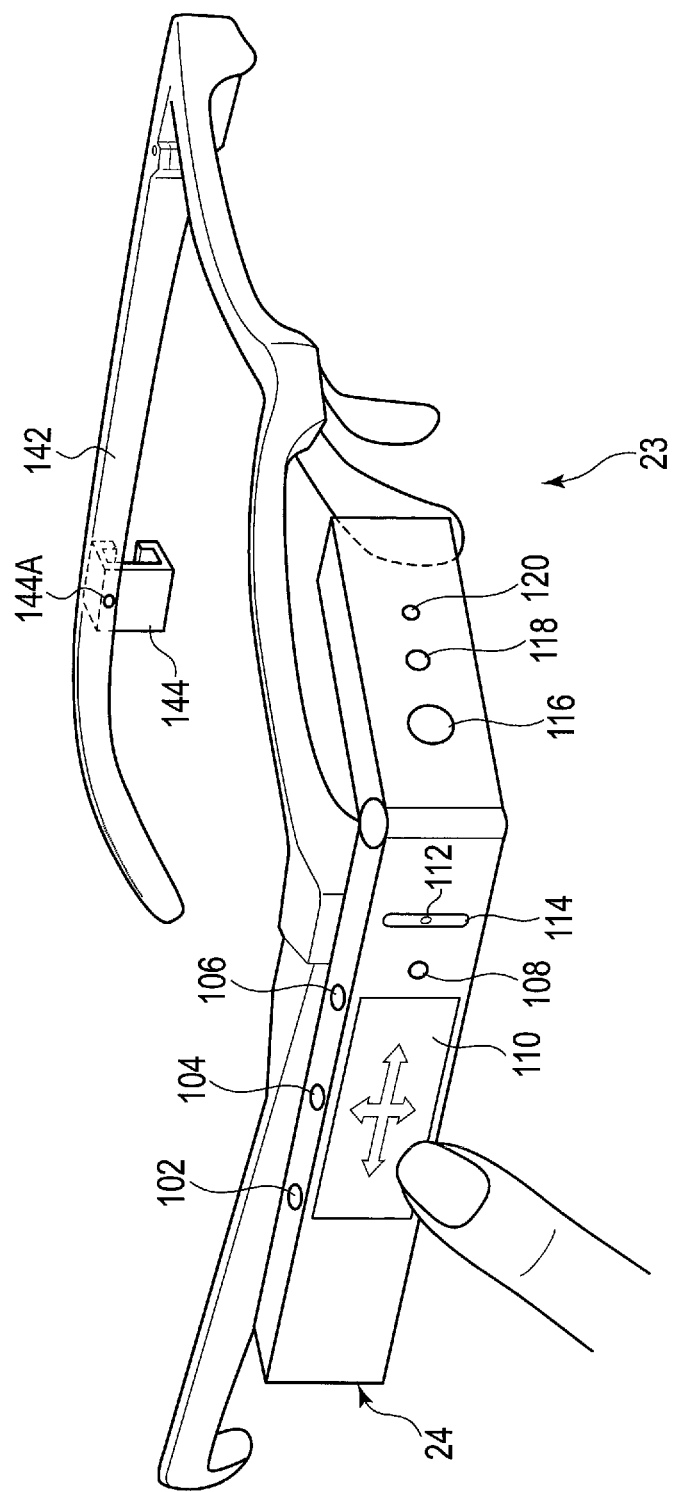
FIG. 3 is a view showing an example of an external appearance of a wearable device (to be connected to the mobile PC) of the embodiment.

FIG. 3 shows an example of an external appearance of the wearable device 23 to be connected to the mobile PC 16. The wearable device 23 is provided with an eyeglass frame 142 and wearable device main body 24. The eyeglass frame 142 may have a shape obtained by removing lenses from general eyeglasses and is worn on the face of the worker. The eyeglass frame 142 may have a structure to which eyeglasses can be attached. When the worker habitually uses eyeglasses at all times, lenses of degrees identical to the habitually used eyeglasses may be attached to the eyeglass frame 142.

The eyeglass frame 142 is provided with mounting brackets 144 on both the right and left temples thereof. The wearable device main body 24 is attached to and detached from one of the mounting brackets 144 on the right or left temple. In FIG. 3, the mounting bracket 144 on the temple on the right side of the worker is hidden behind the wearable device main body 24, and hence is not shown. As described above, the wearable device main body 24 is provided with a display device 124 (shown in FIG. 4). The display device 124 is configured in such a way as to be viewed by one eye. Therefore, the mounting brackets 144 are provided on both the right and left temples so that the wearable device main body 24 can be attached to the mounting bracket on the dominant eye side.

An engaging piece 128 (shown in FIG. 4) of the wearable device main body 24 is forced between upper and lower frames of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144.

In a state where the wearable device main body 24 is attached to the mounting bracket 144, the engaging piece 128 is somewhat movable backward and forward in the mounting bracket 144. Accordingly, the wearable device main body 24 is adjustable in the front-back direction so that the worker's eye can be brought to a focus on the display device 124. Furthermore, the mounting bracket 144 is rotatable around an axis 144A perpendicular to the temple. After the wearable device main body 24 is attached to the eyeglass frame 142, the wearable device main body 24 is adjustable in the vertical direction so that the display device 124 can be positioned on the worker's line of sight. Moreover, the rotational angle of the mounting bracket 144 is about 90 degrees and, by largely rotating the mounting bracket 144 in the upward direction, the wearable device main body 24 can be flipped up from the eyeglass frame 142. Thereby, even when it is difficult to watch the real thing because the field of view is obstructed by the wearable device main body 24 or even when the wearable device main body 24 interferes with surrounding objects in a small space, it is possible to temporarily divert/restore the wearable device main body 24 from/to the field of view of the worker without detaching/reattaching the entire wearable device 23 from/to the face of the worker.

[Wearable Device Main Body 24]

The wearable device main body 24 is constituted of a side part to be along the temple of the eyeglass frame 142, and front part to be positioned on the line of sight of one eyeball of the worker. The angle which the front part forms with the side part is adjustable.

As shown in FIG. 3, on the outside surface of the front part, a camera 116, light 118, and camera LED 120 are provided. The light 118 is an auxiliary lighting fixture emitting light at the time of shooting a dark object. The camera LED 120 is configured to be turned on at the time of shooting a photograph or video to thereby cause the objective person to be photographed to recognize that he or she is to be photographed.

On the top surface of the side part of the wearable device main body 24 attached to the right side temple, first, second, and third buttons 102, 104, and 106 are provided. When the dominant eye of the worker is the left eye, the wearable device main body 24 is attached to the left side temple. The top and the bottom of the wearable device main body 24 are reversed according to whether the wearable main body 24 is attached to the right side temple or to the left side temple. Therefore, the first, second, and third buttons 102, 104, and 106 may be provided on both the top surface and undersurface of the side part.

On the outside surface of the side part, a touch pad 110, fourth button 108, microphone 112, and illuminance sensor 114 are provided. The touch pad 110 and fourth button 108 can be operated by a forefinger. When the wearable device main body 24 is attached to the right side temple, the buttons 102, 104, and 106 are arranged at positions at which the buttons 102, 104, and 106 can be operated by a forefinger, middle finger, and third finger, respectively. The touch pad 110 is configured such that the movement of finger in up and down directions or back and forth directions on the surface on the touch pad 110 as indicated by arrows can be detected. The movement to be detected includes flicking of a finger for grazing the surface quickly in addition to dragging of a finger for moving the finger with the finger kept in contact with the surface. Upon detection of up-and-down or back-and-force movement of the worker's finger, the touch pad 110 inputs a command. In this description, a command implies an executive instruction to execute specific processing to be issued to the wearable device main body 24. Operation procedures for the first to fourth buttons 102, 104, 106, and 108, and touch pad 110 are determined in advance by the application program.

For example, when the third button 106 is pressed once, item selection/item execution is carried out, when the third button 106 is pressed for a long time, a list of activated application programs is displayed, when the second button 104 is pressed once, the screen returns to the home screen, when the second button 104 is pressed for a long time, a menu of quick settings is displayed, and when the first button 102 is pressed once, cancellation (operation identical to the operation of the Esc key of the keyboard) of an operation is executed.

Regarding the operation of the touch pad 110, for example, when the touch pad 110 is dragged up and down, the cursor is moved up and down, when the touch pad 110 is flicked forward (to the front of the head), the left icon is selected (continuously scrolled), when the touch pad 110 is flicked backward (to the back of the head), the right icon is selected (continuously scrolled), when the touch pad 110 is dragged forward, the left icon is selected (items are scrolled one by one), and when the touch pad 110 is dragged backward, the right icon is selected (items are scrolled one by one).

The first button 102 is arranged at such a position as to be operated by a forefinger, second button 104 at a position by a middle finger, third button 106 at a position by a third finger, and fourth button 108 at a position by a little finger. The reason why the fourth button 108 is provided not on the top surface of the side part, but on the outside surface of the side part in FIG. 3 is that there is space restriction. The fourth button 108 may also be provided on the top surface of the side part in the same manner as the first to third buttons 102, 104, and 106. The illuminance sensor 114 detects the illuminance of the surrounding area in order to automatically adjust the brightness of the display device.

Figure 4:
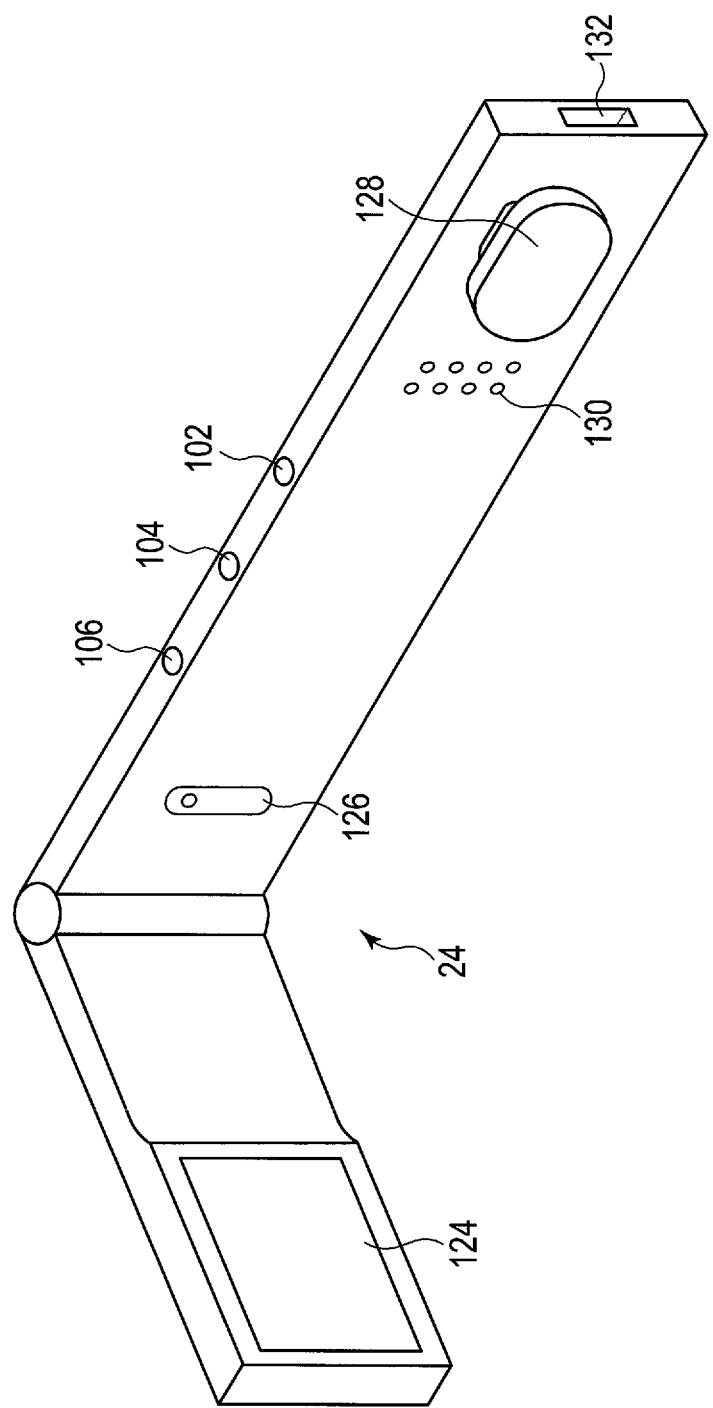
FIG. 4 is a view showing an example of an external appearance of a main body of the wearable device of the embodiment.

FIG. 4 shows an example of an external appearance of the back side of the wearable device main body 24. On the inner side of the front part, a display device 124 constituted of an LCD is provided. On the inner side of the side part, a microphone 126, speaker 130, and engaging piece 128 are provided. The microphone 126 is provided at a front position of the side part, and speaker 130 and engaging piece 128 at a rear position of the side part. Headphones may be used in place of the speaker 130. In this case, the microphone and headphones may also be provided in an integrated manner as an intercom in the same manner as the operator terminal 12.

Figure 5:
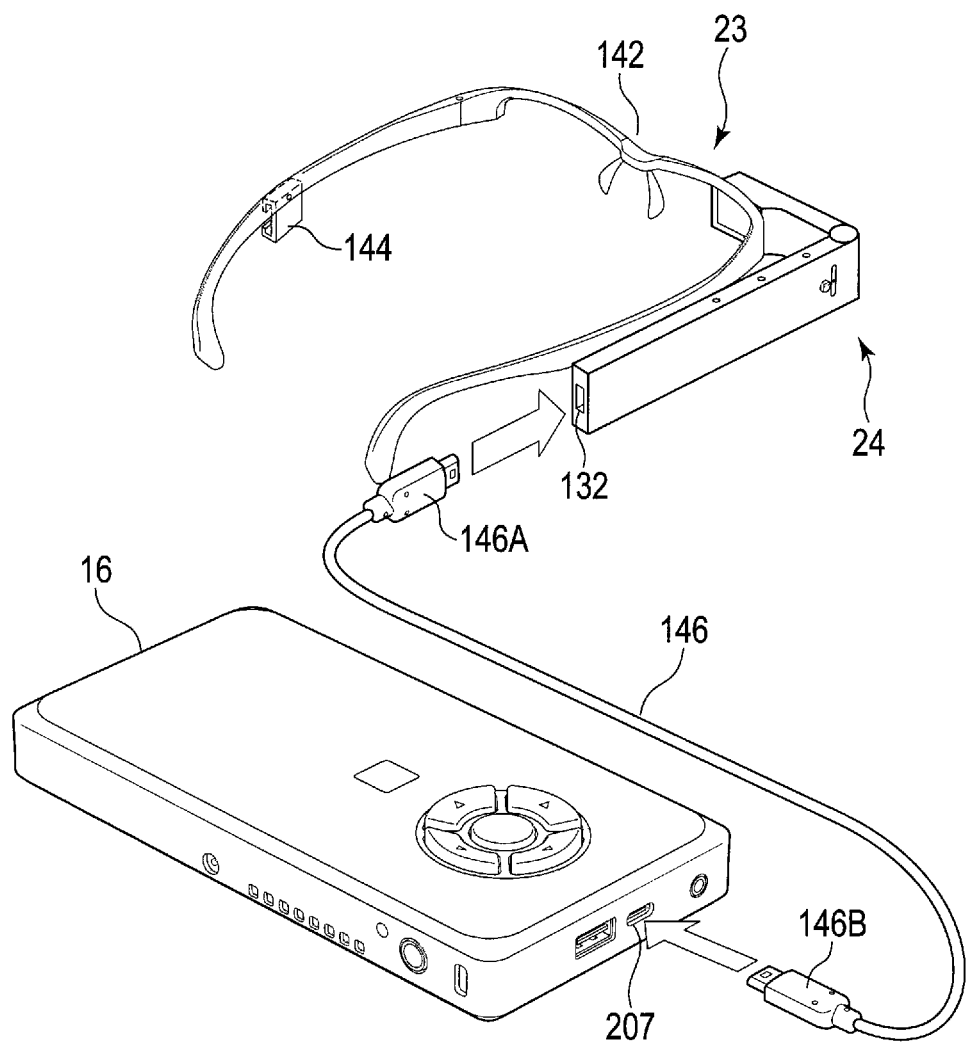
FIG. 5 is a view showing an example of connection between the mobile PC and the wearable device main body in the embodiment.

FIG. 5 shows an example of connection between the mobile PC 16 and wearable device main body 24. At a rear position of the side part, a receptacle 132 into which a plug 146A at one end of a cable 146 conforming to the USB type-C (registered trade mark) standard is to be inserted is provided. A plug 146B at the other end of the USB type-C cable 146 is inserted into a connector 207 conforming to the USB type-C standard provided on an upper end face of the mobile PC 16. As described above, the wearable device main body 24 is connected to the mobile PC 16 through the USB type-C cable 146, and image signals and the like are transmitted from/to the wearable device main body 24 to/from the mobile PC 16 through the USB type-C cable 146. The wearable device main body 24 may also be connected to the mobile PC 16 by means of wireless communication such as a wireless LAN, Bluetooth, and the like.

In the embodiment, the wearable device main body 24 is not provided with a battery or DC terminal serving as a drive power supply, and the drive power is supplied from the mobile PC 16 to the wearable device main body 24 through the USB type-C cable 146. However, the wearable device main body 24 may also be provided with a drive power supply.

As described previously, the wearable device main body 24 is attached to one of the attaching fixtures 144 provided on both the right and left temples of the eyeglass frame 142. Further, the wearable device main body 24 is flipped upside down according to whether the wearable device main body 24 is attached to the attaching fixtures 144 provided on the right side temple of the eyeglass frame 142 or to the attaching fixtures 144 provided on the left side temple thereof. Accordingly, for example, when the wearable device main body 24 attached to the attaching fixtures 144 provided on the right side temple of the eyeglass frame 142 is reattached to the attaching fixtures 144 provided on the left side temple of the eyeglass frame 142 afresh, there is a need to change the setting of the directionality with respect to each of the touch pad 110, display 124, and camera 116 which are devices each having directionality. More specifically, it is necessary to switch the top and bottom. Further, regarding the touch pad 110, the user can carry out setting unique to the user with respect to the right-and-left directionality, and hence, the setting of the right-and-left directionality of the touch pad 110 should be changed in consideration of the unique setting. With reference to FIG. 6A and FIG. 6B, the right-and-left directionality of the touch pad 110 will be described below.

In FIG. 6A and FIG. 6B, it is assumed that the wearable device main body 24 is attached to the attaching fixtures 144 provided on the right side temple of the eyeglass frame 142. Regarding the touch pad 110 provided in the wearable device main body 24, the right-and-left directionality thereof is specified on the assumption that the operation surface thereof is aimed in the same direction as the screen of the display 124. Accordingly, for example, when a touch operation for moving a pointer al displayed on the display 124 is carried out on the touch pad 110, if the pointer al is to be moved to the right, a forward touch operation is to be carried out (FIG. 6A) and, on the other hand, if the pointer al is to be moved to the left, a backward touch operation is to be carried out (FIG. 6B). Note that when the wearable device main body 24 is attached to the attaching fixtures 144 provided on the left side temple of the eyeglass frame 142, conversely, if the pointer al is to be moved to the right, a backward touch operation is to be carried out and, on the other hand, if the pointer al is to be moved to the left, a forward touch operation is to be carried out.

However, depending on the user, it is sometimes felt that the forward or backward operation on the touch pad 110 along the temple of the eyeglass frame, and the rightward or leftward movement of the pointer al on the display 124 are opposite to each other, and hence, it is contrived to enable the right-and-left directionality to be switched. That is, regarding the touch pad 110, it is made possible to change a setting value indicating the right-and-left directionality from a specified value indicating the right-and-left directionality prescribed as specifications to a non-specified value flipping the directionality horizontally, this being previously described with reference to FIG. 6A and FIG. 6B.

Accordingly, when the setting of the directionality has already been changed in such a manner as to switch the right-and-left directionality of the touch pad 110, the right-and-left directionality of the touch pad 110 should furthermore be changed in consideration of this change.

Thus, the mobile PC 16 of this embodiment is provided with a contrivance for improving the usability regarding the setting of a device having directionality, and this point will be described below in detail.

Figure 7:
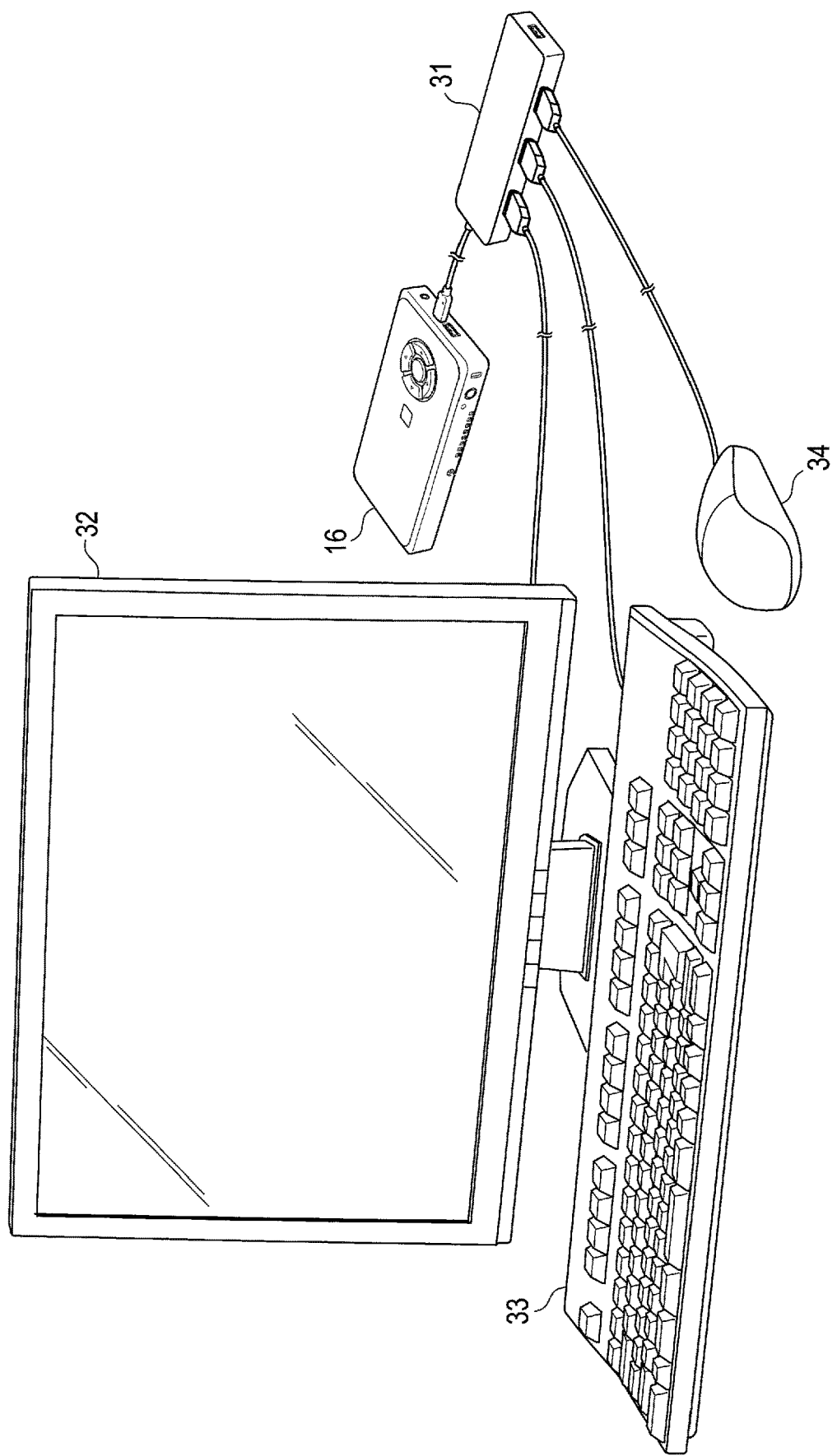
FIG. 7 is an exemplary view showing an example of a connection between the mobile PC and various external devices (external display, external keyboard, and external pointing device) in the embodiment.

The settings of the directionality of the touch pad 110, display 124, and camera 116 which are provided in the wearable device main body 24 are retained in the configuration file 400 (shown in FIG. 9) to be described later stored in the mobile PC 16. The setting of the directionality of each device retained in the configuration file can be carried out in a state where the wearable device main body 24 is connected to the mobile PC 16 as shown in FIG. 5. Further, this setting can also be carried out in a state where the external display 32, external keyboard 33, external pointing device 34, and the like are connected to the mobile PC 16 through, for example, a USB hub 31 as shown in FIG. 7. The former (FIG. 5) is a connection form of a case where the worker mainly carries out the setting, and the latter (FIG. 7) is a connection form of a case where the administrator (or operator) mainly carries out the setting. The mobile PC 16 provides the Graphical User Interface (GUI) for setting the directionality of each device in the connection form shown in FIG. 5 and GUI for setting the directionality of each device in the connection form shown in FIG. 7. Note that it is also possible for the administrator to directly edit the configuration file 400 in the connection form shown in FIG. 7 not by usage of the GUI provided by the mobile PC 16.

FIG. 8 is a block diagram showing an exemplary structure of the wearable device main body 24. The USB type-C connector 132 is connected to a mixer 166. A display controller 170 and USB hub 164 are respectively connected to a first terminal, and second terminal of the mixer 166. The display device 124 is connected to the display controller 170. A camera controller 168, audio codec 172, and sensor controller 162 are connected to the USB hub 164. The camera 116, light 118, and camera LED 120 are connected to the camera controller 168. Audio signals from the microphones 112 and 126 are input to the audio codec 172, and audio signal from the audio codec 172 is input to the speaker 130 through an amplifier 174.

A motion sensor (for example, acceleration, geomagnetism, gravitation, gyroscopic sensor, etc.) 176, the illuminance sensor 114, a proximity sensor 178, the touch pad 110, the first to fourth buttons 102, 104, 106, and 108, and a GPS sensor 180 are connected to the sensor controller 162. The sensor controller 162 processes detection signals from the motion sensor 176, illuminance sensor 114, proximity sensor 178, touch pad 110, first to fourth buttons 102, 104, 106, and 108, and GPS sensor 180, and supplies a command to the mobile PC 16. Although not shown in FIG. 4, the motion sensor 176, and proximity sensor 178 are arranged inside the wearable device main body 24. The motion sensor 176 detects a motion, direction, attitude, and the like of the wearable device main body 24. The proximity sensor 178 detects attachment of the wearable device 23 on the basis of approach of a face, finger and the like of the worker thereto.

Note that the sensor controller 162 connected to the touch pad 110, display controller 170 connected to the display 124, and camera controller 168 connected to the camera 116 are respectively unconscious of the directionality of the touch pad 110, display 124, and camera 116. The directionality of the touch pad 110, display 124, and camera 116 is recognized by the mobile PC 16 side which carries out transmission/reception of data to/from the wearable device main body 24 provided with the sensor controller 162, display controller 170, and camera controller 168. For example, when the display 124 is flipped upside down, a display image to be displayed on the display 124 is transmitted from the mobile PC 16 to the wearable device main body 24 in a state where the display image is flipped upside down, and the display controller 170 displays the image on the display 124 as it is. The sensor controller 162 or camera controller 168 processes a detection signal from the touch pad 110 to create a command or outputs an image shot by the camera 116 irrespective of presence/absence of a top/bottom reversal of the touch pad 110 or camera 116. On the mobile PC 16 side receiving the command or shot image, if the touch pad 110 or camera 116 is flipped upside down, the received command is interpreted or the received shot image is flipped upside down in consideration of the above fact. The mobile PC 16 executes the processing regarding the directionality of each of these devices on the basis of the configuration file 400 (shown in FIG. 9). For example, when the configuration file 400 is edited in such a manner as to flip the display 124 upside down, the mobile PC 16 changes "Orientation" to "Flipped" in the "Display Setting" of the OS 316 to be described later as the processing regarding the directionality of the display 124. Further, when the configuration file 400 is edited as to the touch pad 110 or camera 116, the mobile PC 16 updates a predetermined register of an EC/KBC 344 or system controller 302 to be described later to thereby make the register reflect the edited contents.

Figure 9:
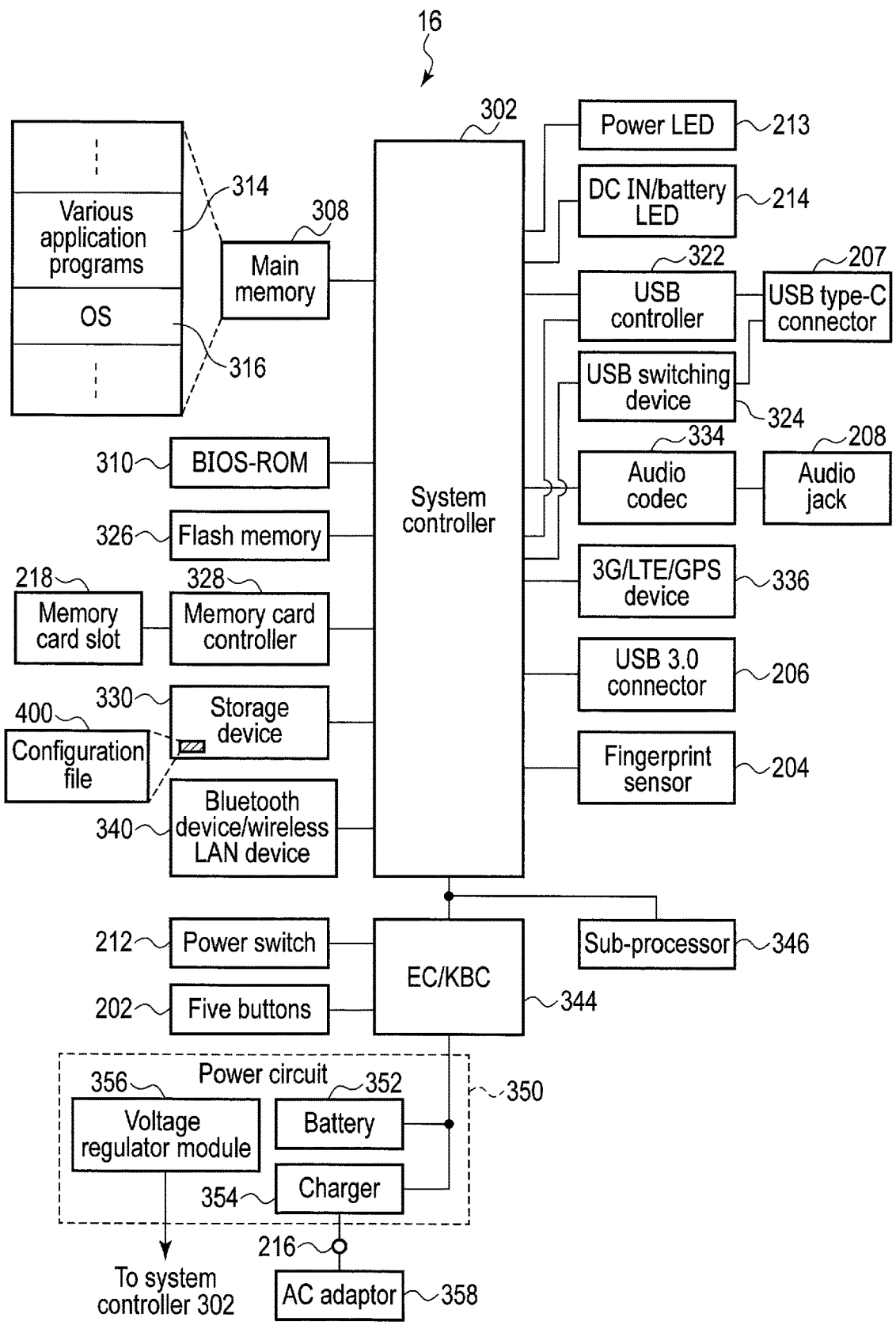
FIG. 9 is a block diagram showing an exemplary structure of the mobile PC of the embodiment.

FIG. 9 is a block diagram showing an exemplary structure of the mobile PC 16. The mobile PC 16 can carry out video distribution of an image shot by the wearable device main body 24 to the operator terminal 12, and enables browse of the image received from the operator terminal 12. For this reason, the mobile PC 16 is provided with a camera function and viewer function. The camera function is a function of shooting a photograph or video by means of the camera 116 of the wearable device main body 24. The shot photograph and video are stored in a camera folder (not shown) in the mobile PC 16, and can be browsed by the viewer function. The viewer function is a function of enabling browse of a file stored in the camera folder. The types of the files include image, moving image, PDF file, photograph and video shot by the camera function, image received from the operator terminal 12, image transmitted to the operator terminal 12, and file stored in a user folder (not shown) in the mobile PC 16.

The mobile PC 16 is provided with a system controller 302. The system controller 302 is constituted of a processor (CPU) and controller/hub. A main memory 308, the power LED 213, the DC IN/battery LED 214, and a USB controller 322 are connected to the processor of the system controller 302. A flash memory 326, a memory card controller 328, a storage device 330 constituted of an HDD or SSD, a USB switching device 324, an audio codec 334, a 3G/LTE/GPS device 336, the fingerprint sensor 204, the USB 3.0 connector 206, a Bluetooth/wireless LAN device 340, and an EC/KBC 344 are connected to the controller/hub of the system controller 302. In the storage device 330, the configuration file 400 in which various settings regarding the wearable device main body 24 including settings of the directionality of the touch pad 110, display 124, and camera 116 are retained is stored.

The system controller 302 executes various programs to be loaded from the storage device 330 to the main memory 308. These programs include an Operating System (OS) 316, and various application programs 314 including utilities operating under the control of the OS 316. The GUI provided by the mobile PC 16 and configured to set the directionality of the devices (touch pad 110, display 124, and camera 116) provided in the wearable device main body 24 is realized by some application programs included in the various application programs 314. The various application programs 314 will be described later. Further, the system controller 302 includes a function of flipping an image shot by the camera 116 of the wearable device main body 24 and received through the USB type-C connector 207 and USB controller 322 upside down on the basis of a value of a built-in register to thereby capture the image.

The audio codec 334 converts a digital audio signal which is an object to be reproduced into an analog audio signal, and supplies the converted analog signal to the audio jack 208. Further, the audio codec 334 converts an analog audio signal input from the audio jack 208 into a digital signal.

The memory card controller 328 gains access to a memory card such as an SD card to be inserted into the memory card slot 218, and controls read/write of data from/to the SD card.

The USB controller 322 carries out control of transmission/reception of data to/from the USB type-C cable 146 (shown in FIG. 5) connected to the USB type-C connector 207 or the USB 3.0 cable (not shown) connected to the USB 3.0 connector 206.

As shown in, for example, FIG. 7, a port expansion adaptor such as the USB hub 31 or the like can be connected to the USB type-C connector 207, and thus various external devices (external display 32, external keyboard 33, external pointing device 34) can be used and, further an interface such as the High-Definition Multimedia Interface (HDMI) (registered trade mark) or the like can also be used.

The Bluetooth/wireless LAN device 340 executes wireless communication conforming to the Bluetooth/IEEE802.11 standard for the purpose of connection to the network 22. The connection to the network 22 may not depend on wireless communication, and may depend on wired LAN communication conforming to the IEEE802.3 standard.

The fingerprint sensor 204 is used for fingerprint authentication at the time of startup of the mobile PC 16.

A sub-processor 346, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by the cooperative operation of the EC/KBC 344 and power circuit 350. Even during a power-off period of the mobile PC 16, the EC/KBC 344 operates by the power from a battery 352 or AC adaptor 358 connected as an external power supply. The power circuit 350 uses the power from the battery 352 or AC adaptor 358 to thereby generate power to be supplied to each component. The power circuit 350 includes a voltage regulator module 356. The voltage regulator module 356 is connected to the processor in the system controller 302. Further, the EC/KBC 344 receives the operation contents of the touch pad 110 provided in the wearable device main body 24 through the system controller 302. The EC/KBC 344 has a function of flipping the operation contents of the touch pad 110 upside down and horizontally (right side left) on the basis of the value of the built-in register to thereby recognize the operation contents.

Although the mobile PC 16 is constituted as a body separate from the wearable device main body 24, the mobile PC 16 may be incorporated into the wearable device main body 24, and both of them may also be integrated into one body.

[Setting of Devices having Directionality]

As described previously with reference to FIG. 3, the wearable device main body 24 is attached to one of the right and left temples of the eyeglass frame 142. The wearable device main body 24 is flipped upside down according to whether the wearable device main body 24 is attached to the right side temple or to the left side temple, and hence, as described previously, for example, when the wearable device main body 24 attached to the attaching fixtures 144 provided on the right side temple of the eyeglass frame 142 is reattached to the attaching fixtures 144 provided on left side temple of the eyeglass frame 142 afresh, there is a need to change the setting of the directionality with respect to each of the touch pad 110, display 124, and camera 116 which are devices each having directionality. Further, regarding the touch pad 110, the user can carry out setting unique to the user with respect to the right-and-left directionality, and hence, the setting of the right-and-left directionality of the touch pad 110 should be changed in consideration of the unique setting. The mobile PC 16 of this embodiment realizes a contrivance for improving the usability regarding setting of a device having directionality by usage of the various application programs 314.

FIG. 10 is a view showing an example of the various application programs 314 used to improve the usability regarding setting of a device having directionality.

In order to improve the usability regarding setting of the devices each having directionality such as the touch pad 110, display 124, camera 116, and the like provided in the wearable device main body 24, the mobile PC 16 includes an administrator's setting utility (program) 3141, a worker's setting utility (program) 3142, and a setting service (program) 3143 as part of the various application programs 314. More specifically, in the mobile PC 16, the administrator's setting utility 3141, the worker's setting utility 3142, and the setting service 3143 are installed.

The administrator's setting utility 3141 provides a GUI used to set the directionality of the devices (touch pad 110, display 124, and camera 116) provided in the wearable device main body 24 in the connection form shown in FIG. 7. That is, the administrator's setting utility 3141 provides a GUI, based on the assumption that the external display 32, the external keyboard 33, and the external pointing device 34, and the like are to be connected to the mobile PC 16. More specifically, the administrator's setting utility 3141 provides a GUI, based on the assumption that an administrator (or operator) operates the external keyboard 33 and the external pointing device 34 to carry out setting.

On the other hand, the worker's setting utility 3142 provides a GUI used to set the directionality of the devices provided in the wearable device main body 24 in the connection form shown in FIG. 5. That is, the worker's setting utility 3142 provides a GUI, based on the assumption that the wearable device 23 is to be connected to the mobile PC 16. More specifically, the worker's setting utility 3142 provides a GUI, based on the assumption that a worker operates, for example, the five buttons 202 of the mobile PC 16 to carry out setting.

When the administrator (or operator) sets the directionality of the devices provided in the wearable device main body 24, the administrator's setting utility 3141 is activated, and when the worker sets the directionality of the devices provided in the wearable device main body 24, the worker's setting utility 3142 is activated. The administrator's setting utility 3141 or the worker's setting utility 3142 activated by the administrator (or operator) or worker activates the setting service 3143. That is, concomitantly with the activation of the administrator's utility 3141 or the worker's setting utility 3142, the setting service 3143 is activated. Further, the setting service 3143 is terminated concomitantly with the termination of the administrator's setting utility 3141 or the worker's setting utility 3142.

The setting service 3143 edits the configuration file 400 retaining various settings regarding the wearable device main body 24 including settings of the directionality of the touch pad 110, display 124, and camera 116 in response to a request from the administrator's setting utility 3141 or the worker's setting utility 3142. Further, by having edited the configuration file 400 in response to the request from the administrator's setting utility 3141 or the worker's setting utility 3142, the setting service 3143 applies the edited contents to the mobile PC 16. To be more specific, as described previously, the setting service 3143 changes "Orientation" to "Flipped" in the "Display Setting" of the OS 316, or updates a predetermined register of the EC/KBC 344 or the system controller 302.

Note that, the setting service 3143 may be made a resident program, and Application Programming Interface (API) of the setting service 3143 may be opened to specific application programs other than the administrator's setting utility 3141 and the worker's setting utility 3142 so that these application programs can edit the configuration file 400 through the setting service 3143. It is also possible for the administrator to directly edit the configuration file 400 without the aid of the GUI provided by the administrator's setting utility 3141.

The setting service 3143 starts up also when the mobile PC 16 is powered on, and applies the contents of the configuration file 400 to the mobile PC 16. Accordingly, when the administrator has directly edited the configuration file 400, the edited contents are reflected therein at the time of the next power-on of the mobile PC 16.

FIG. 11 is a view showing an example of various settings retained in the configuration file 400 regarding the wearable device main body 24 including the settings of the directionality of the touch pad 110, display 124, and camera 116.

In FIG. 11, an item "Orientation" indicated by a reference symbol b1 is an item for setting whether the direction of the display 124 is to be made a direction based on the assumption of a state where the wearable device main body 24 is attached to the left side temple of the eyeglass frame 142 (Left) or is to be made a direction based on the assumption of a state where the wearable device main body 24 is attached to the right side temple (Right). The default setting is the direction based on the assumption of the state where the wearable device main body 24 is attached to the right side temple. For example, the state of the default setting is called a first form, and the state other than the default setting is called a second form.

Each of the item "Flip up-down direction" indicated by a reference symbol b2 and item "Flip left-right direction" indicated by a reference symbol b3 is an item regarding the directionality of the touch pad 110. The item "Flip up-down direction" (b2) is set to "On (valid)" when the up-down direction of the touch pad 110 is to be made the direction based on the assumption of the state where the wearable device main body 24 is attached to the left side temple of the eyeglass frame 142. On the other hand, the item "Flip left-right direction" (b3) is set to "On (valid)" when the left-right direction of the touch pad 110 is to be made the direction opposite to the direction described previously with reference to FIG. 6. For example, when the wearable device main body 24 is to be attached to the left side temple of the eyeglass frame 142, the item "Flip up-down direction" (b2) is set to "On (valid)". Further, when it is desired that the wearable device main body 24 be attached to the left side temple of the eyeglass frame 142, and the left-right direction of the touch pad 110 be made the direction opposite to the direction described with reference to FIG. 6, there is no need to take the fact that the touch pad 110 is flipped upside down into consideration, and it is sufficient if the item "Flip left-right direction" (b3) is set to "On (valid)". All of these default settings are "Off (invalid)".

The item "Orientation" indicated by a reference symbol b4 is an item for setting whether the direction of the camera 116 is to be made the direction based on the assumption of the state where the wearable device main body 24 is attached to the left side temple of the eyeglass frame 142 (Left) or is to be made the direction based on the assumption of the state where the wearable device main body 24 is attached to the right side temple thereof (Right). The default setting is the direction based on the assumption of the state where the wearable device main body 24 is attached to the right side temple. Note that the item "Auto Orientation" indicated by a reference symbol b5 will be described later. Further, although not shown in FIG. 11, in the configuration file 400, a setting value indicating one of a right-eye mode in which the wearable device 23 is used for a right eye, and a left-eye mode in which the wearable device 23 is used for a left eye, is also retained.

FIG. 12 is a view showing an example of a setting screen displayed on, for example, the external display 32 by the administrator's setting utility 3141.

As shown in FIG. 12, for example, on the left side part of the setting screen, a list area in which various setting items are listed as alternatives is provided. For example, when an item "Display" indicated by a reference symbol c1 is selected by using the external keyboard 33 or the external pointing device 34, it is possible to move to the screen for carrying out setting regarding the display 124 described previously with reference to FIG. 11. Further, for example, when an item "Touchpad" indicated by a reference symbol c2 is selected by using the external keyboard 33 or the external pointing device 34, it is possible to move to the screen for carrying out setting regarding the touch pad 110 described previously with reference to FIG. 11. Furthermore, when an item "Camera" indicated by a reference symbol c3 is selected by using the external keyboard 33 or the external pointing device 34, it is possible to move to the screen for carrying out setting regarding the camera 116 described previously with reference to FIG. 11. That is, by usage of the setting screen displayed by the administrator's setting utility 3141, firstly, it is possible to separately carry out setting regarding each of the display 124, the touch pad 110, and the camera 116.

Besides, on the setting screen displayed by the administrator's setting utility 3141, an item "Left/right mode" (c4) for setting the wearable device 23 to right-eye usage or left-eye usage is further arranged. The term "right-eye usage" implies that the wearable device 23 is used with the wearable device main body 24 attached to the right side temple of the eyeglass frame 142, and the term "left-eye usage" implies that the wearable device 23 is used with the wearable device main body 24 attached to the left side temple of the eyeglass frame 142. Hereinafter, in some cases, using the wearable device 23 as that for right-eye usage is referred to as "a right-eye mode", and using the wearable device 23 as that for left-eye usage is referred to as "a left-eye mode". When this item "Left/right mode" (c4) is selected by using the external keyboard 33 or the external pointing device 34, it is possible to move to the screen for setting the right-eye mode or the left-eye mode and, when a change in setting from one of the right-eye mode and the left-eye mode to the other is carried out, secondly, it is possible to collectively change the settings to be respectively changed in the aforementioned items "Display" (c1), "Touchpad" (c2), and "Camera" (c3).

More specifically, it is possible to collectively change the setting values of "Orientation" (b1) regarding the display 124, "Flip up-down direction" (b2) regarding the touch pad 110, and "Orientation" (b4) regarding the camera 116 in such a manner as to reverse the top/bottom and right/left (Left-Right, On-Off). Further, as to the item "Flip left-right direction" (b3) regarding the touch pad 110, the setting value at that time is maintained as it is. That is, a change in the setting value is not carried out. As a result, when setting of reversing the directionality prescribed in the specifications has already been carried out, the right-and-left directionality of the touch pad 110 in the revered state is further reversed (restored to the directionality prescribed as the specifications).

In the more detailed description of "the directionality in the reversed state is further reversed", when a change in setting from one of the right-eye mode and the left-eye mode to the other has already been carried out, the right-and-left directionality of the touch pad 110 is not simply set to the other of the right-eye mode and the left-eye mode, and the directionality thereof is changed in accordance with the setting of the item "Flip left-right direction" (b3).

That is, the mobile PC 16 of this embodiment is not configured to, for example, when the wearable device 23 is switched from one of the right-eye usage and the left-eye usage to the other, simply change all the settings of the directionality of the devices (display 124, camera 116, and touch pad 110) each having directionality from the setting values applied at that time.

The worker's setting utility 3142 displays a setting screen corresponding to the setting screen displayed by the administrator's setting utility 3141. The setting screen is configured in such a manner that the setting screen can be operated by using, for example, only the five buttons 202 of the mobile PC 16 on the display 124 of the wearable device main body 24.

As described above, it is possible for the mobile PC 16 of this embodiment to collectively change, for example, when the wearable device 23 is switched from one of the right-eye usage and the left-eye usage to the other, the settings of the directionality of the devices (touch pad 110, display 124, and camera 116) provided in the wearable device main body 24. Furthermore, at that time, if a unique setting (particular to the user) of reversal of the right-and-left directionality of the touch pad 110 has already been carried out, it is possible for the mobile PC 16 to change the settings of the directionality in consideration of the unique setting. That is, the mobile PC 16 of this embodiment can improve the usability regarding setting of devices each having directionality.

Figure 13:
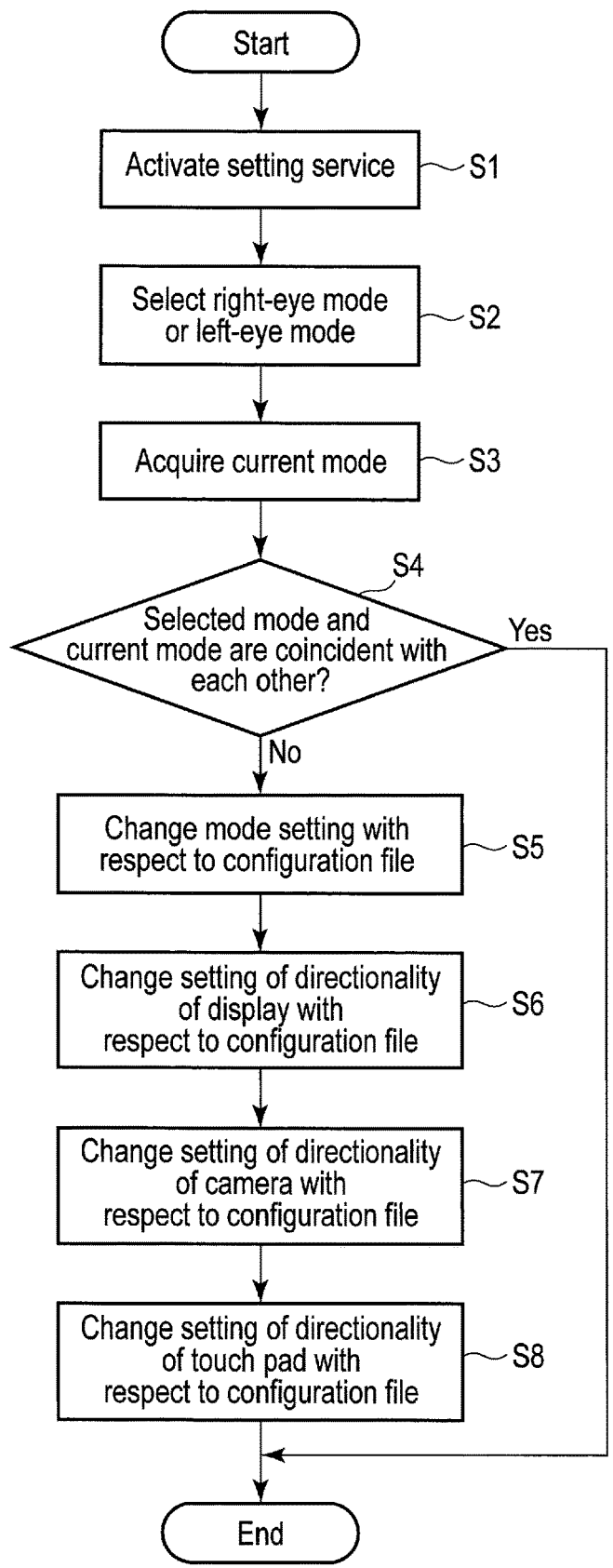
FIG. 13 is a flowchart showing an example of a flow of processing regarding settings of directionality of various devices (touch pad, display, and camera) provided in the wearable device main body to be carried out by the mobile PC of the embodiment.

FIG. 13 is a flowchart showing the flow of processing regarding settings of the directionality of the various devices (touch pad 110, display 214, and camera 116) provided in the wearable device main body 24 to be executed by the mobile PC 16 of this embodiment.

First, the administrator's setting utility 3141 or the worker's setting utility 3142 is activated whereby the setting service 3143 is activated (step S1). Next, it is selected whether the wearable device 23 is to be used in the right-eye mode or in the left-eye mode through the GUI provided by the administrator's setting utility 3141 or the GUI provided by the worker's setting utility 3142 (step S2).

The setting service 3143 acquires the mode currently applied to the wearable device 23 from the configuration file 400 (step S3), and determines whether or not the mode selected in step S2 and the mode acquired in step S3 are coincident with each other (step S4). When both modes are not coincident with each other (step S4: NO), i.e., when a change from one of the right-eye mode and the left-eye mode to the other is to be carried out, the setting service 3143 first executes editing of the configuration file 400 for changing the mode setting (step S5). Subsequently, concomitantly with this editing, the setting service 3143 executes editing of the configuration file 400 for changing the setting of the directionality of the display 124 (step S6), editing of the configuration file 400 for changing the setting of the directionality of the camera 116 (step S7), and editing of the configuration file 400 for changing the setting of the directionality of the touch pad 110 (step S8). Further, regarding the directionality of the touch pad 110, the setting service 3143 does not simply change each setting value regarding the directionality, and executes editing of the configuration file 400 so that the unique setting (particular to the user) of reversal of the right-and-left directionality can be maintained.

As described above, according to the mobile PC 16 of this embodiment, it is possible to improve the usability regarding the settings of the devices each having directionality provided in the wearable device main body 24.

Incidentally, in the description given so far, an example in which the administrator (or operator) or the worker activates the administrator's setting utility 3141 or the worker's setting utility 3142 to thereby change the mode (right-eye mode/left-eye mode) of the wearable device 23 has been shown. As shown in FIG. 8, the wearable device main body 24 includes a motion sensor 176 which is, for example, an acceleration sensor or the like. Thus, by means of a detection signal of the motion sensor 176, the mobile PC 16 of this embodiment is further provided with a contrivance to determine to which of the right and left temples of the eyeglass frame 142, the wearable device main body 24 is attached, and automatically change the mode of the wearable device 23 as the need arises.

In FIG. 11, an example of various settings retained in the configuration file 400 regarding the wearable device main body 24 (including the settings of the directionality of the touch pad 110, display 124, and camera 116) is shown, and the item "Auto Orientation" indicated by a reference symbol b5 is an item for setting whether or not the mode of the wearable device 23 is to be automatically changed. When the item "Auto Orientation" (b5) is "On (valid)", the function of automatically changing the mode of the wearable device 23 on the basis of the detection signal of the motion sensor 176 is activated. This function can be realized by making, for example, when the item "Auto Orientation" (b5) is set to "On (valid)", the setting service 3143 operate as a resident program.

For example, the setting service 3143 (operating as a resident program) periodically acquires a detection signal of the motion sensor 176. Further, when the acquired detection signal is a signal to be obtained in a mode different from the mode currently applied to the wearable device 23, the setting service 3143 executes editing of the configuration file 400 for changing the setting of the mode and, concomitantly with this, executes editing of the configuration file 400 for changing the settings of the directionality of the display 124, camera 116, and touch pad 110. Further, as described previously, regarding the directionality of the touch pad 110, the setting service 3143 executes editing of the configuration file 400 so that the unique setting (particular to the user) of reversal of the right-and-left directionality can be maintained.

Further, as a utilization method of the item "Auto Orientation" (b5), by setting first the item "Auto Orientation" (b5) to "On (valid)" to thereby attach the wearable device main body 24 to one of the right and left temples of the eyeglass frame 142 of the desired side, settings of the directionality of the display 124, camera 116, and touch pad 110 are caused to be automatically and appropriately executed. Thereafter, by setting the item "Auto Orientation" (b5) to "Off (invalid)", saving of the automatically and appropriately executed settings of the directionality of the display 124, camera 116, and touch pad 110 is conceivable.

By virtue of this contrivance, the mobile PC 16 of this embodiment can further improve the usability regarding settings of the devices each having directionality and provided in the wearable device main body 24.

Since the processing of the present embodiment can be implemented by a computer program, a similar effect can be easily obtained merely by installing and executing a computer program which is stored in a computer readable storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device connectable to a wearable device which comprises a plurality of devices each having a directionality,
the electronic device comprising:
a processor that sets a usage form of the wearable device, the usage form including the directionality of each of the plurality of devices, wherein
when the usage form is set to change from a first form to a second form, the processor changes a setting of the directionality of all of the plurality of devices to reverse the directionality of each of the plurality of devices,
the setting of the directionality of a first device in the plurality of devices allows changing a setting value of the directionality of the first device from a specified value to a non-specified value to reverse the directionality of the first device, the specified value indicating the directionality determined as specifications of the first form, and
when the usage form is set to change from the first form to the second form on condition that the setting value of the directionality of the first device is changed to the non-specified value, the processor sets the directionality indicated by the specified value to the directionality of the first device.

2. The electronic device of claim 1, wherein
the wearable device comprises an eyeglass frame, and a main body to be attached to a first temple or a second temple of the eyeglass frame,
the main body is attached to the second temple on condition that the main body is flipped upside down as compared to when the main body is attached to the first temple, and
the first device comprises a touch pad provided in the main body.

3. The electronic device of claim 2, wherein at least one of the plurality of devices comprises a display provided in the main body.

4. The electronic device of claim 2, wherein at least one of the plurality of devices comprises a camera provided in the main body.

5. A wearable device which comprises a plurality of devices each having a directionality,
the wearable device comprising:
a processor that sets a usage form of the wearable device, the usage form including the directionality of each of the plurality of devices, wherein
when the usage form is set to change from a first form to a second form, the processor changes a setting of the directionality of all of the plurality of devices to reverse the directionality of each of the plurality of devices,
the setting of the directionality of a first device in the plurality of devices allows changing a setting value of the directionality of the first device from a specified value to a non-specified value to reverse the directionality of the first device, the specified value indicating the directionality determined as specifications of the first form, and
when the usage form is set to change from the first form to the second form on condition that the setting value of the directionality of the first device is changed to the non-specified value, the processor sets the directionality indicated by the specified value to the directionality of the first device.

6. The wearable device of claim 5, further comprising:
an eyeglass frame; and
a main body to be attached to a first temple or a second temple of the eyeglass frame, wherein
the main body is attached to the second temple on condition that the main body is flipped upside down as compared to when the main body is attached to the first temple, and
the first device comprises a touch pad provided in the main body.

7. The wearable device of claim 6, wherein at least one of the plurality of devices comprises a display provided in the main body.

8. The wearable device of claim 6, wherein at least one of the plurality of devices comprises a camera provided in the main body.

9. A setting method for a wearable device which comprises a plurality of devices each having a directionality, the setting method comprising:
setting a usage form of the wearable device, the usage form including the directionality of each of the plurality of devices; and
when the usage form is changed from a first form to a second form by the setting, changing a setting of the directionality of all of the plurality of devices to reverse the directionality of each of the plurality of devices, wherein
the setting of the directionality of a first device in the plurality of devices allows changing a setting value of the directionality of the first device from a specified value to a non-specified value to reverse the directionality of the first device, the specified value indicating the directionality determined as specifications of the first form,
the setting method further comprises,
when the usage form is changed from the first form to the second form on condition that the setting value of the directionality of the first device is changed to the non-specified value, setting the directionality indicated by the specified value to the directionality of the first device.

10. The setting method of claim 9, wherein
the wearable device comprises an eyeglass frame, and a main body to be attached to a first temple or a second temple of the eyeglass frame,
the main body is attached to the second temple on condition that the main body is flipped upside down as compared to when the main body is attached to the first temple, and
the first device comprises a touch pad provided in the main body.

11. The setting method of claim 10, wherein at least one of the plurality of devices comprises a display provided in the main body.

12. The setting method of claim 10, wherein at least one of the plurality of devices comprises a camera provided in the main body.

* * * * *